(12) United States Patent
Barsness et al.

(10) Patent No.: US 10,437,978 B2
(45) Date of Patent: *Oct. 8, 2019

(54) ENHANCING SECURITY OF A MOBILE DEVICE BASED ON LOCATION OR PROXIMITY TO ANOTHER DEVICE

(71) Applicant: International Business Machines Corporation, Armonk, NY (US)

(72) Inventors: Eric L. Barsness, Pine Island, MN (US); Jay S. Bryant, Rochester, MN (US); James E. Carey, Rochester, MN (US); Joseph W. Cropper, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 212 days.

This patent is subject to a terminal disclaimer.

(21) Appl. No.: 15/424,838

(22) Filed: Feb. 4, 2017

(65) Prior Publication Data

US 2018/0225456 A1  Aug. 9, 2018

(51) Int. Cl.
*G06F 21/32* (2013.01)
*G06F 21/57* (2013.01)
*G06F 21/35* (2013.01)

(52) U.S. Cl.
CPC .............. *G06F 21/35* (2013.01); *G06F 21/32* (2013.01); *G06F 21/57* (2013.01); *G06F 2221/034* (2013.01); *G06F 2221/2111* (2013.01); *G06F 2221/2113* (2013.01)

(58) Field of Classification Search
CPC .......................... G06F 21/35; G06F 2221/2111
See application file for complete search history.

(56) References Cited

U.S. PATENT DOCUMENTS

| 7,000,116 | B2 | 2/2006 | Bates et al. |
| 8,869,305 | B1* | 10/2014 | Huang .................. G06F 21/604 380/258 |
| 2008/0218196 | A1 | 9/2008 | Eckhart |
| 2010/0024017 | A1* | 1/2010 | Ashfield ................. G06F 21/35 726/7 |
| 2010/0048167 | A1 | 2/2010 | Chow et al. |

(Continued)

OTHER PUBLICATIONS

Barsness et al., "Enhancing Security of a Mobile Device Based on Location or Proximity to Another Device", U.S. Appl. No. 15/424,841, filed Feb. 4, 2017.

(Continued)

*Primary Examiner* — Carl G Colin
*Assistant Examiner* — Gary E Lavelle
(74) *Attorney, Agent, or Firm* — Martin & Associates, LLC; Derek P. Martin

(57) ABSTRACT

A mobile device detects its location and other devices in proximity to the mobile device. When the device is in an untrusted location, or is in physical proximity to an untrusted device, the mobile device ensures existing security and authentication mechanisms are in place, and may additionally require enhanced security measures on the device. In addition, the device may modify its functionality based on the mobile device being in an untrusted location or in physical proximity to an untrusted device.

15 Claims, 6 Drawing Sheets

(56) References Cited

U.S. PATENT DOCUMENTS

| | | | |
|---|---|---|---|
| 2012/0009896 A1* | 1/2012 | Bandyopadhyay | G06F 1/1643 |
| | | | 455/411 |
| 2013/0169434 A1 | 7/2013 | McCown et al. | |
| 2013/0208103 A1* | 8/2013 | Sands | G06F 21/31 |
| | | | 348/78 |
| 2014/0187200 A1 | 7/2014 | Reitter et al. | |
| 2014/0372743 A1* | 12/2014 | Rogers | H04L 9/3234 |
| | | | 713/2 |
| 2016/0164865 A1* | 6/2016 | Speicher | H04L 63/0861 |
| | | | 726/4 |
| 2016/0381199 A1* | 12/2016 | Pelly | H04L 43/16 |
| | | | 455/557 |
| 2017/0269955 A1* | 9/2017 | Hardy | G06F 9/45558 |
| 2017/0374045 A1* | 12/2017 | Ulbrich | G06F 21/62 |

OTHER PUBLICATIONS

Appendix P—List of IBM Patents or Patent Applications Treated as Related, dated Mar. 1, 2017.

How to: Password Protect Your Android (Only) When Away From Home, printed from http://hackerspace.kinja.com/how-to-password-protect-your-android-only-when-away-1486618852, Dec. 19, 2013.

NFCBrief, "How to: Automatically Unlock and Lock an Android Phone with an NFC Ring", printed from http://www.nfcbrief.com/2013/07/how-to-automatically-unlock-and-lock.html, Jul. 23, 2013.

\* cited by examiner

| Untrusted Locations | Untrusted Location Protocol |
|---|---|
| Pat's Work | Two-level Authentication:<br>1) Fingerprint Scan<br>2) Password |

| Untrusted Devices | Untrusted Device Protocols |
|---|---|
| Pat's Phone | Blank Display |
|  | Face Recognition |
|  | Disable All Network Interfaces |
| Pat's Tablet | Blank Display |
|  | Fingerprint |
|  | Disable All Notifications |
| Terry's Phone | Two-level authentication<br>1) Voice Recognition<br>2) Password |
|  | Disable All Notifications |

ENHANCING SECURITY OF A MOBILE DEVICE BASED ON LOCATION OR PROXIMITY TO ANOTHER DEVICE

BACKGROUND

1. Technical Field

This disclosure generally relates to mobile devices, and more specifically relates to enhancing security of a mobile device.

2. Background Art

Mobile devices such as smart phones and tablet computers typically include authentication mechanisms that require a user to enter a password or other authentication information before granting access to the device. A current trend is to make it easier to access a mobile device. For example, on Android phones a user can add "trusted" devices. When a trusted device is paired with a phone, the phone will not automatically lock. Thus, if a user has a Bluetooth-enabled workout watch that logs the person's workouts, and the watch is paired to the user's phone, it is likely the user is also near the phone, so the phone does not need to lock. The trend is therefore to make devices easier to access by avoiding locking the device or not requiring authentication when other devices are near. This trend may compromise the security of devices in some circumstances.

SUMMARY

A mobile device detects its location and other devices in proximity to the mobile device. When the device is in an untrusted location, or is in physical proximity to an untrusted device, the mobile device ensures existing security and authentication mechanisms are in place, and may additionally require enhanced security measures on the device. In addition, the device may modify its functionality based on the mobile device being in an untrusted location or in physical proximity to an untrusted device.

The foregoing and other features and advantages will be apparent from the following more particular description, as illustrated in the accompanying drawings.

BRIEF DESCRIPTION OF THE DRAWING(S)

The disclosure will be described in conjunction with the appended drawings, where like designations denote like elements, and:

FIG. 10 is a table showing an example of an untrusted location protocol for an untrusted location; and FIG. 11 is a table showing examples of untrusted device protocols corresponding to three different untrusted devices.

DETAILED DESCRIPTION

The disclosure and claims herein relate to a mobile device that detects its location and other devices in proximity to the mobile device. When the device is in an untrusted location, or is in physical proximity to an untrusted device, the mobile device ensures existing security and authentication mechanisms are in place, and may additionally require enhanced security measures on the device. In addition, the device may modify its functionality based on the mobile device being in an untrusted location or in physical proximity to an untrusted device.

Figure 1:
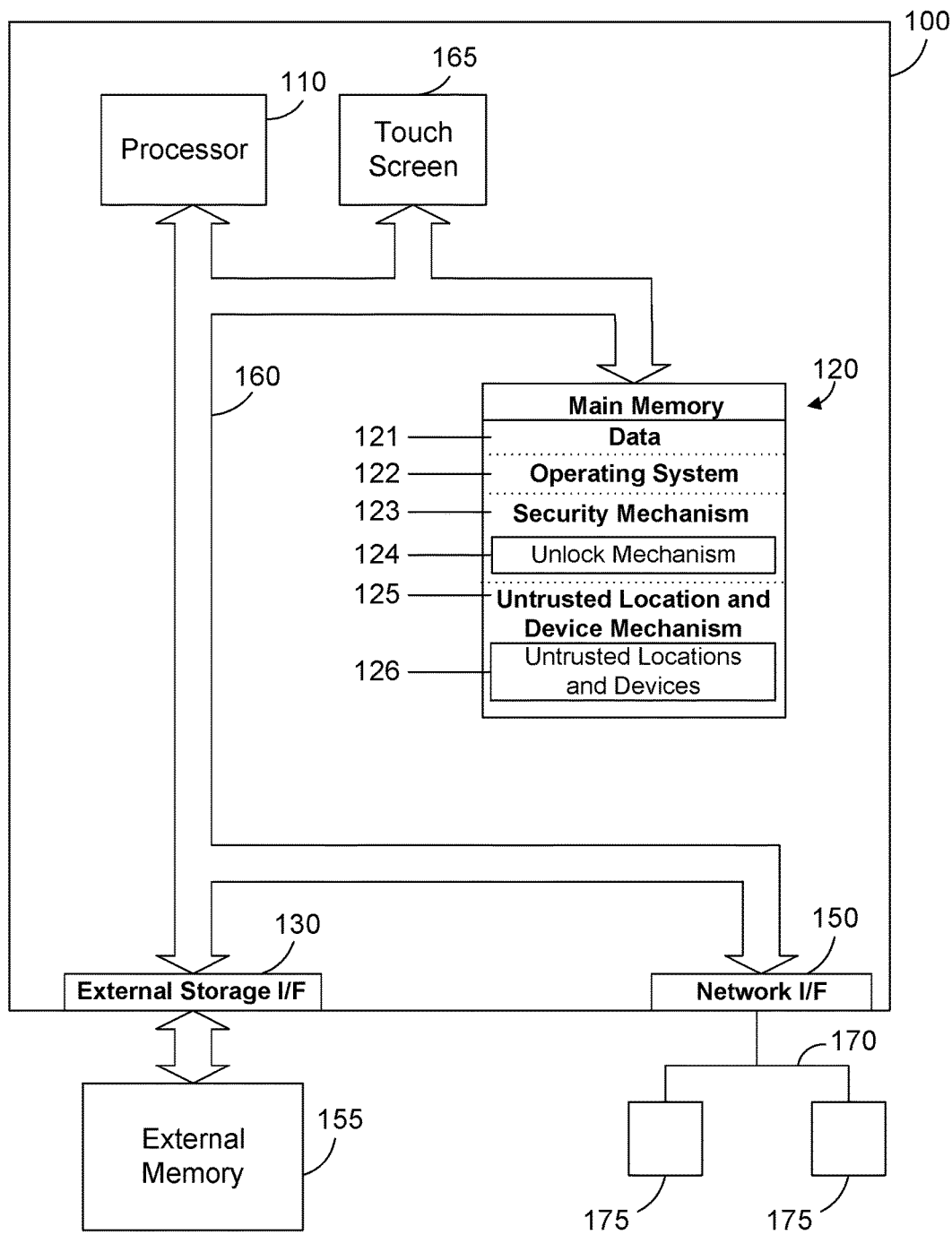
FIG. 1 is a block diagram of a mobile device.

Referring to FIG. 1, a mobile device 100 represents any suitable type of mobile device, including without limitation a smart phone, tablet computer, electronic book reader, notebook computer, laptop computer, gaming console, smart watch, etc. Those skilled in the art will appreciate that the disclosure herein applies equally to any type of mobile device. As shown in FIG. 1, one suitable mobile device 100 comprises one or more processors 110, a main memory 120, an external storage interface 130, a network interface 150, and a touch screen 165. These system components are interconnected through the use of a system bus 160. External storage interface 130 is used to access external memory 155. One specific type of external memory 155 is non-volatile memory on an external device, such as an SD card, a micro-SD card, or a thumb drive.

Main memory 120 preferably contains data 121, an operating system 122, a security mechanism 123, and an untrusted location and device mechanism 125. Data 121 represents any data that serves as input to or output from any program in mobile device 100. Operating system 122 could be any suitable operating system for a mobile device. Known operating systems for mobile devices include the iOS operating system developed by Apple Computer, the Android operating system developed by Google, and the Windows Phone operating system developed by Microsoft. Security mechanism 123 is software that provides security for the mobile device in any suitable form, including passwords, biometric identification such as facial recognition or fingerprint identification, graphical unlock patterns, etc. While this disclosure is directed to untrusted devices and locations, the security mechanism 123 could also vary security for the mobile device when the mobile device is in the presence of trusted devices or trusted locations. Security mechanism 123 preferably includes an unlock mechanism 124 that is used to unlock the mobile device 100 after it has been locked by the security mechanism 123. For example, many mobile devices are configured to blank the display after a predetermined time period, such as five minutes. When the user presses a button to get the display to come back on, the user may be asked for a password, fingerprint swipe, etc. to unlock the phone. This prevents an unauthorized user from picking up someone else's phone and having immediate access to the phone and the user's data stored on the phone.

The untrusted location and device mechanism 125 includes a list of untrusted locations and devices 126. When the untrusted location and device mechanism 125 detects the mobile device 100 is in an untrusted location, it takes action to enable the normal security measures by security mechanism 123, or it can take action to provide enhanced security measures, or to modify the functions of the mobile device 100. In similar fashion, when the untrusted location and device mechanism 125 detects the mobile device 100 is in physical proximity to an untrusted device, the untrusted location and device mechanism 125 takes action to provide enhanced security measures, or to modify the functions of the mobile device 100. The enhanced security measures and modification of functions of the mobile device 100 are discussed in more detail below. The untrusted location and device mechanism 125 provides additional security for a mobile device when the mobile device is in an untrusted location or in physical proximity to an untrusted device.

Main memory 120 may include any suitable combination of different memory types. For example, main memory 120 could include dynamic random access memory (DRAM) that has a relatively small size and a fast access time and could also include non-volatile memory (NVRAM) that has a much larger size and a slower access time. Programs stored in NVRAM could then be loaded into the DRAM in order to be executed by the processor 110. This simple example shows the main memory 120 can include any suitable number and type of memories in any suitable hierarchy, whether currently known or developed in the future.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the security mechanism 123 and untrusted location and device mechanism 125 under the control of the operating system 122.

Although mobile device 100 is shown to contain only a single processor and a single system bus, those skilled in the art will appreciate that the untrusted location and device mechanism may be practiced using a mobile device that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Touch screen 165 is a display that allows the user to select functions on the mobile device 100 by touching the touch screen 165 and/or by making one or more gestures on the touch screen 165, including a finger swipe and a finger tap. Touch screens on mobile devices are well-known in the art.

Network interface 150 is used to connect mobile device 100 to a network 170. Network interface 150 broadly represents any suitable way to interconnect electronic devices, such as mobile device 100, to other devices 175, regardless of whether the network 170 comprises present-day analog and/or digital techniques or via some networking mechanism of the future. Network interface 150 preferably includes a combination of hardware and software that allow communicating on the network 170. The network interface 150 can include multiple different network interfaces. For example, network interface 150 could include a wireless interface for communicating with a 4G network, a WiFi interface for communicating with a WiFi network, and a Bluetooth interface for communicating with other devices via Bluetooth. Software in the network interface 150 preferably includes a communication manager that manages communication with other devices 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

Network interface 150 shown in FIG. 1 may include multiple different network interfaces. For example, network interface 150 may include a telephone network (e.g., 4G) network interface, a Wi-Fi interface, a Bluetooth interface, a Near Field Communication interface, or any other type of suitable network interface, whether currently known or developed in the future.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
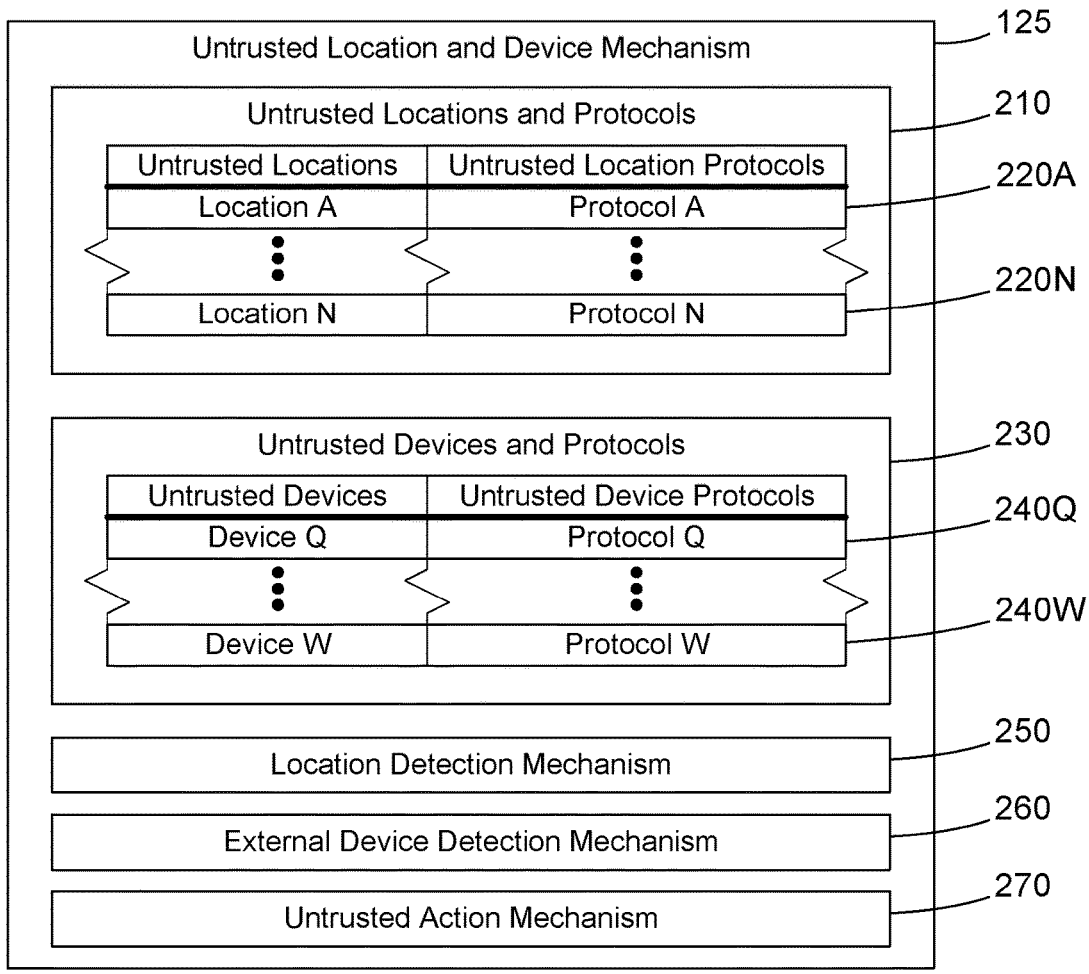
FIG. 2 is a block diagram showing one suitable implementation for the untrusted location and device mechanism shown in FIG. 1.

One suitable implementation for the untrusted location and device mechanism 125 in FIG. 1 is shown in FIG. 2. In this particular implementation, the untrusted location and device mechanism includes two tables, a first table 210 that includes untrusted locations and corresponding untrusted location protocols, and a second table 230 that includes untrusted devices and untrusted device protocols. Tables 210 and 230 thus include the untrusted locations and devices 126 shown in FIG. 1. Table 210 for untrusted locations and protocols includes multiple entries 220, shown in FIG. 2 as entries 220A, . . . , 220N, which represents table 210 may have any suitable number of entries. Each entry specifies an untrusted location and one or more corresponding untrusted location protocols. Thus, Location A has a corresponding Protocol A as shown in entry 220A. Protocol A defines actions to take when the mobile device determines it is in Location A. Similarly, Location N has a corresponding Protocol N, which defines actions to take when the mobile device determines it is in Location N. Any suitable number of entries can be included in table 210. In the most preferred implementation, there is one entry in table 210 for each untrusted location.

Untrusted location and device mechanism 125 additionally includes an untrusted devices and protocols table 230 with multiple entries that each specifies an untrusted device and one or more corresponding protocols. Table 230 in FIG. 2 is shown with an entry 240Q that correlates untrusted Device Q to a corresponding Protocol Q that specifies actions to take when the mobile device is in physical proximity to Device Q. An entry 240W correlates untrusted device W with a corresponding Protocol W. Any suitable number of entries can be included in table 230. In the most preferred implementation, there is one entry in table 230 for each untrusted device.

The untrusted location and device mechanism 125 includes a location detection mechanism 250, an external device detection mechanism 260, and an untrusted action mechanism 270. The location detection mechanism 250 detects a current location for the mobile device, and determines when the current location is within one of the untrusted locations specified in table 210. The location detection mechanism 250 can function in any suitable way. For example, a user could define untrusted locations, and distance X, and the location detection mechanism 250 can then execute the protocols for an untrusted location anytime the user's mobile device is within distance X of a defined untrusted location. The external device detection mechanism 260 detects devices in physical proximity to the mobile device, such as devices on the same Wi-Fi network, devices within Bluetooth proximity of the mobile device, devices within range of Near Field Communications, etc. When an untrusted location or device is detected, the untrusted action mechanism 270 reads the protocol(s) that correspond to the untrusted device or location, and performs one or more actions indicated by the protocol(s). Specific examples are given in FIGS. 10 and 11 and are discussed below.

The term "protocol" as used herein is used in a general sense to mean any action the mobile device might need to take as a result of detecting the mobile device is in an untrusted location or detecting the mobile device is in physical proximity to an untrusted device. A protocol may include any suitable action or collection of actions within the scope of the disclosure and claims herein. Specific examples are provided below and in the drawings for the purpose of illustration.

The untrusted locations may be specified by the user in any suitable way. For example, an untrusted location could be specified by the user using Global Positioning System (GPS) coordinates. In one suitable example, the user could use a GPS-enabled app on the mobile device to define a region that is an untrusted region. Thus, the user could go to a starting point, click on the app to define a GPS coordinate, go to the next point, click on the app to define the next GPS coordinate, and so on until the user has defined multiple GPS coordinates that could be connected in connect-the-dot fashion to define an untrusted location. In another suitable example, an untrusted location could correspond to a specific network name, and anytime the mobile device connects the network name that is an untrusted location, the mobile device is deemed to be in an untrusted location. This could be used, for example, when a user travels frequently and eats at the same chain restaurant in different locations during the user's travels. Assuming the restaurant has a network name that includes the name of the restaurant, the user could define all networks that include specific text as untrusted. Of course, wildcards could also be used. In the restaurant example above, if the user defines an untrusted location as *<restaurantName>*, and if the "*" is a wildcard, all networks that include the text corresponding to <restaurantName> will be untrusted locations. An untrusted location as discussed herein expressly includes any geographical location, region or area that can be identified using any suitable mechanism or means, whether currently known or developed in the future.

The untrusted device may be specified by the user in any suitable way. For example, an untrusted device could be specified using the device's name or network identifier when the untrusted device and the user's mobile device are on the same network. For example, when a user knows they are on a common Wi-Fi network with the device the user wants to specify as an untrusted device, the user could query the Wi-Fi network for the identifiers of all devices on the Wi-Fi network, then select one of the devices as an untrusted device. If the user knows how a person names his or her devices, the user could specify a device name. Note the user could use wildcards as well. Thus, if the user knows the person puts his name "Pat" in the device names for all of Pat's devices, the user could specify that any device that includes the name "Pat" is an untrusted device. An untrusted device could also be specified using a wireless network name if the device is broadcasting a Wi-Fil signal. An untrusted device as discussed herein expressly includes any type of device that can be identified in any suitable mechanism or means, whether currently known or developed in the future.

Figure 3:
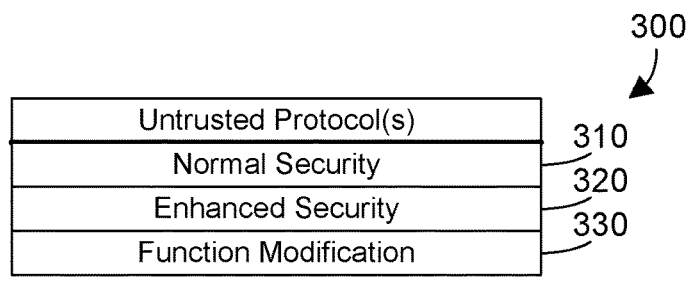
FIG. 3 is a table showing examples of categories for protocols for untrusted locations or devices.

The untrusted location protocols in table 210 and untrusted device protocols in table 230 in FIG. 2 include any suitable protocols for untrusted locations or devices. FIG. 3 shows a table 300 that includes three different categories of untrusted protocols, which include normal security 310, enhanced security 320, and function modification 330. These three categories can apply to untrusted locations, untrusted devices, or both. Each of these untrusted protocols shown in FIG. 3 is discussed in more detail below.

Normal security protocols 310 represents protocols that enforce security features that are native to the mobile device, even when the presence of an accessory, such as the sports watch discussed in the Background section above, might otherwise dictate less security. Security features are native to the mobile device when they are provided, for example, as part of the operating system of the mobile device. Enhanced security protocols 320 represent protocols that enforce enhanced security on the mobile device, as discussed in more detail below. Enhanced security protocols 320 may include security features that are native to the mobile device, as well as security features that are not native to the mobile device, but are provided by the untrusted location and device mechanism. Function modification protocols 330 represent protocols that alter the function of the mobile device, as discussed in more detail below.

Figure 4:
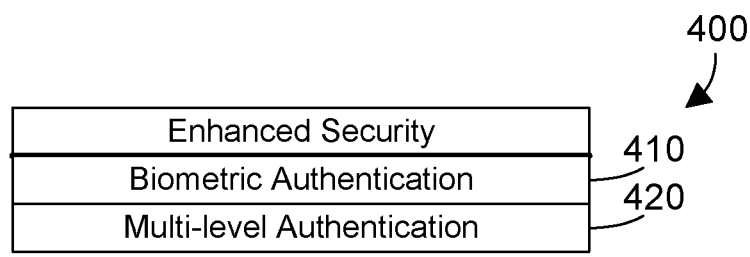
FIG. 4 is a table showing examples of categories of enhanced security for untrusted locations or devices.
Figure 5:
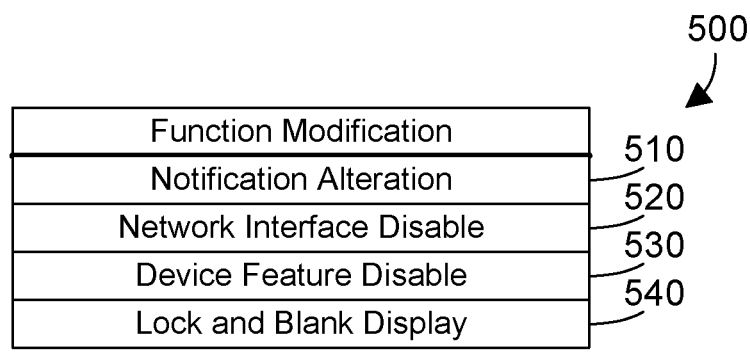
FIG. 5 is table showing examples of categories of function modification for a mobile device when an untrusted location or device is detected.

A table 400 in FIG. 4 shows suitable examples of categories of enhanced security protocols 320 in FIG. 3. Enhanced security protocol categories in table 400 include biometric authentication 410 and multi-level authentication 420. Biometric authentication 410 may include any suitable authentication using any suitable biometric or combination of biometrics. Examples of suitable biometric authentication 410 include fingerprint scanning, face recognition, voice recognition, eye recognition, etc.

Multi-level authentication 420 may include performing multiple functions to unlock the mobile device. For example, multi-level authentication 420 could require the user to scan a fingerprint, then enter a password. Multi-level authentication 420 can include any suitable type, number and combinations of authentications.

A table 500 shows suitable examples of categories of function modification protocols 330 shown in FIG. 3. Function modification protocols may include notification alteration protocols 510, network interface disable protocols 520, device feature disable protocols 530, and lock and blank display 540. Notification alteration protocols 510 may include altering normal notifications on the mobile device. For example, notification alteration protocols 510 may include not providing the normal notifications for e-mail, text messages, phone calls, alarms, etc. Network interface disable protocols 520 may disable one or more of the network interfaces in the mobile device. Network interfaces that could be disabled include the telephone network interface; a Bluetooth interface; a Wi-Fi interface, etc. Device feature disable 530 can disable any feature normally available on the mobile device. For example, Samsung phones can transfer files between two phones using Near Field Communication (NFC). This is an example of a device feature that could be disabled. Lock and blank display 540 does just that, it locks the mobile device and blanks its display.

Figure 6:
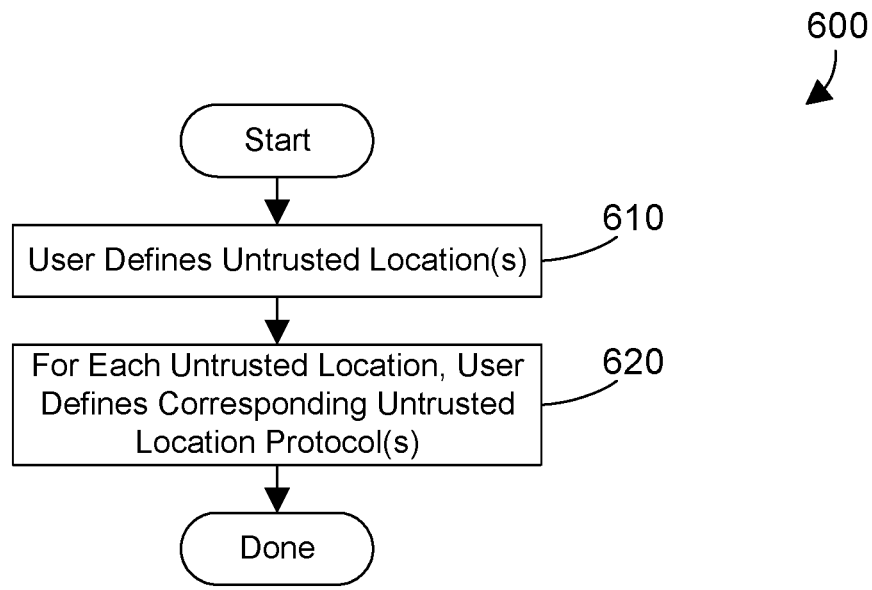
FIG. 6 is a flow diagram of a method for a user to define one or more untrusted locations and to define for each untrusted location one or more corresponding untrusted location protocols.
Figure 7:
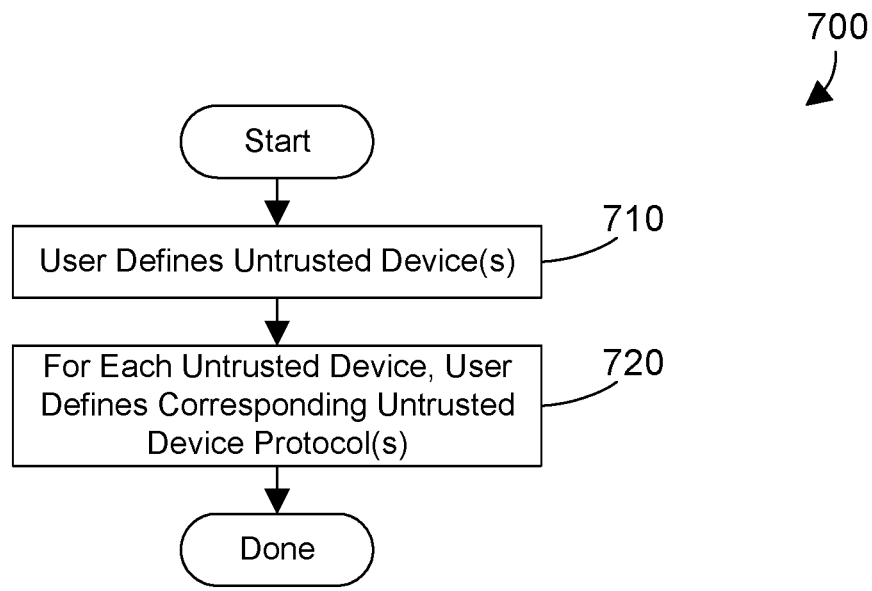
FIG. 7 is a flow diagram of a method for a user to define one or more untrusted devices and to define for each untrusted device one or more corresponding untrusted device protocols.

Referring to FIG. 6, a method 600 is used by a user to define one or more untrusted locations and one or more corresponding untrusted location protocols. The user defines untrusted locations (step 610). For each untrusted location, the user defines one or more corresponding untrusted location protocols (step 620). Method 600 is then done. Method 600 is used to construct the untrusted locations and protocols table 210 shown in FIG. 2. Method 700 in FIG. 7 performs a similar function for untrusted devices. The user defines one or more untrusted devices (step 710). For each untrusted device, the user defines one or more corresponding untrusted device protocols (step 720). Method 700 is then done. Method 700 is used to construct the untrusted devices and protocols table 230 shown in FIG. 2. Once untrusted locations and/or devices have been defined by the user, along with one or more corresponding protocols, the untrusted location and device mechanism 125 can enhance the security of the mobile device.

Figure 8:
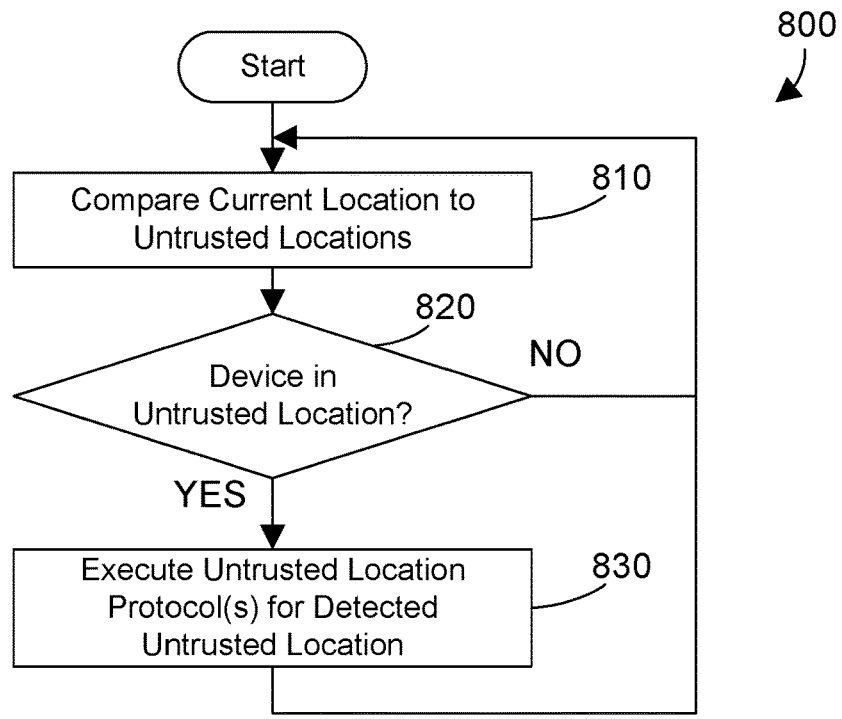
FIG. 8 is a flow diagram of a method performed by the untrusted location and device mechanism in FIG. 1 for untrusted locations.

Referring to FIG. 8, method 800 is preferably performed by the untrusted location and device mechanism 125 shown in FIGS. 1 and 2. The current location of the mobile device is monitored, and compared with the defined untrusted locations (step 810). When the current location of the mobile device indicates the mobile device is in an untrusted location (step 820=YES), the untrusted location protocol(s) corresponding to the detected untrusted location are executed (step 830). When the mobile device is not in an untrusted location (step 820=NO), method 800 loops back to step 810 and continues.

Figure 9:
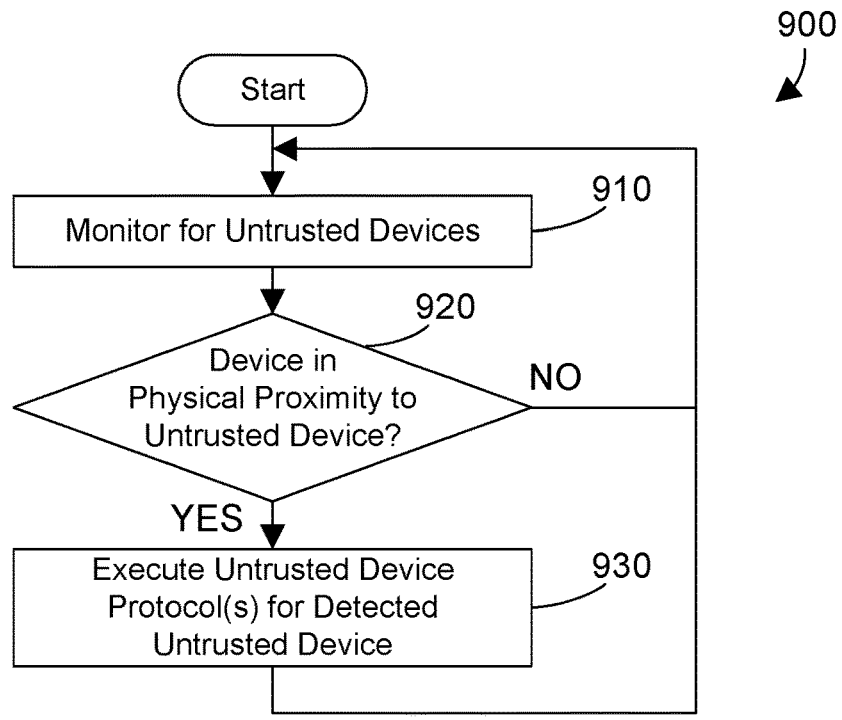
FIG. 9 is a flow diagram of a method performed by the untrusted location and device mechanism in FIG. 1 for untrusted devices.

Referring to FIG. 9, method 900 is preferably performed by the untrusted location and device mechanism 125 shown in FIGS. 1 and 2. The presence of untrusted devices is in physical proximity to the user's mobile device is monitored (step 910). When the device is in physical proximity to an untrusted device (step 920=YES), the untrusted device protocol(s) for the detected untrusted device are executed (step 930). When the device is not in physical proximity to any untrusted device (step 920=NO), method 900 loops back to step 910 and continues. Note the methods 800 and 900 are most preferably performed both continuously and concurrently by the untrusted location and device mechanism.

Specific examples are now given of the general teachings discussed above. We assume a user of a mobile device has separated from their spouse and is seeking a divorce. FIG. 10 shows a table 1010 that is a suitable example of untrusted locations and protocols table 210 shown in FIG. 2. We assume the spouse's name is Pat, and the user has defined Pat's Work 1020 as an untrusted location. The user has also specified a corresponding untrusted location protocol 1022 in FIG. 10, which specifies to provide two-level authentication when the user's mobile device is at Pat's work. Specifically, the user's device will require a fingerprint scan followed by entry of a password. Note the location designated "Pat's work" may be defined by the user in any suitable way, including specifying GPS coordinates, specifying a Wi-Fi network at Pat's work, selecting "here" from an untrusted location menu when the user is at Pat's work, etc. When the user's mobile device detects its current location corresponds to Pat's Work, the mobile device will require a fingerprint scan followed by a password to unlock the mobile device. Providing two-level authentication to unlock the user's mobile device provides enhanced security when the mobile device is at Pat's work.

FIG. 11 shows a table 1110 that is a suitable example of untrusted devices and protocols table 230 shown in FIG. 2. We assume the user has defined three devices as untrusted devices, namely: Pat's Phone 1120, Pat's Tablet 1130, and Terry's phone 1140. We assume for this example Terry is Pat's best friend. The user has defined multiple enhanced security protocols, referred to herein as untrusted device protocols, for each of the untrusted devices. Thus, when the user's mobile device detects Pat's Phone in physical proximity of the user's mobile device, the user's mobile device will blank the display 1122, require face recognition 1124 to unlock the mobile device, and disable all network interfaces 1126. When the user's mobile device detects Pat's Tablet 1130 in physical proximity of the user's mobile device, the user's mobile device will blank the display 1132, require a fingerprint scan 1134 to unlock the user's mobile device, and disable all notifications 1136, which includes notifications for phone calls, text messages, e-mails, alarms, etc. When the user's mobile device detects Terry's Phone 1140 in physical proximity of the user's mobile device, the user's mobile device will require two-level authentication 1142 to unlock the user's mobile device, which includes voice recognition and a password, and the user's mobile device will disable all notifications 1144.

The disclosure and specific examples above show how a user can very easily define untrusted locations and devices, then define corresponding protocols that will be executed when the user's mobile device is in an untrusted location or is in physical proximity to the user's mobile device. This allows customizing enhanced security for the user's mobile device based on detected untrusted locations and detected untrusted devices. The untrusted location and device protocols most preferably are executed without further input by the user. Thus, if the user goes to Pat's Work to have Pat sign paperwork, the untrusted location protocols 1022 corresponding to Pat's Work 1020 are automatically executed once the user's mobile device detects its current location corresponds to Pat's Work. Similarly, if the user' device comes into physical proximity of any untrusted device, the corresponding untrusted device protocol(s) will be executed. This can serve as a type of alarm to alert the user of the presence of an untrusted device. For example, let's assume the user is having lunch at a restaurant, and Pat decides to see what the user is up to, so Pat goes to the restaurant and manages to sit a few booths away without being spotted by the user. When the user's mobile device detects Pat's phone 1120, the user's mobile device will immediately blank the display 1122, disable all network interfaces 1126 and require face recognition 1124 to unlock the phone. The user will thus have an indication on the user's mobile device that Pat is around by the immediate blanking of the display (even if the user is in the middle of doing something on the mobile device) and by the disabling of the network interfaces and the required facial recognition to unlock the device.

Note the term "physical proximity" as used herein is used to denote a device that is nearby. For example, devices on the same Wi-Fi network and devices within Bluetooth range are within physical proximity of each other. Detecting the presence of a device that is not nearby does not fall within the scope of "physical proximity" as described herein. For example, if the user's mobile device detects Pat is online via Skype, this is a detection of one of Pat's devices, but the fact that Pat is online via Skype gives no indication of whether Pat's device is within physical proximity of the user's mobile device. Because the invention disclosed herein relates to security measures on the user's mobile device, the security measure primarily need to be deployed when in physical proximity to an untrusted device or when in an untrusted location.

A mobile device detects its location and other devices in proximity to the mobile device. When the device is in an untrusted location, or is in physical proximity to an untrusted device, the mobile device ensures existing security and authentication mechanisms are in place, and may additionally require enhanced security measures on the device. In addition, the device may modify its functionality based on the mobile device being in an untrusted location or in physical proximity to an untrusted device.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A mobile device comprising:
   a processor;
   a memory coupled to the processor;
   an untrusted location residing in the memory;
   at least one untrusted location protocol residing in the memory that corresponds to the untrusted location, wherein the at least one untrusted location protocol specifies at least one action that provides security for the mobile device when the mobile device is in the untrusted location, wherein the at least one action comprises disabling notifications for e-mail, text messages, phone calls and alarms on the mobile device, and disabling a plurality of network interfaces in the mobile device;
   a location detection mechanism that detects a current location of the mobile device; and
   an untrusted location mechanism that detects when the current location is in the untrusted location, and in response, executes the at least one untrusted location protocol corresponding to the untrusted location, and detects when the current location is no longer in the untrusted location, and in response, stops executing the at least one untrusted location protocol corresponding to the untrusted location, thereby discontinuing the disabling of the notifications for e-mail, text messages, phone calls and alarms on the mobile device and thereby discontinuing the disabling of the plurality of network interfaces on the mobile device.

2. The mobile device of claim 1 wherein the at least one action comprises enforcing security for the mobile device that is native to the mobile device.

3. The mobile device of claim 1 wherein the at least one action comprises enforcing enhanced security for the mobile device, wherein the advanced security comprises biometric authentication.

4. The mobile device of claim 1 wherein the at least one action comprises enforcing enhanced security for the mobile device, wherein the advanced security comprises multi-level authentication for the mobile device.

5. The mobile device of claim 1 wherein the at least one action comprises disabling at least one feature of the mobile device.

6. The mobile device of claim 1 wherein the at least one action comprises locking the mobile device and blanking a display on the mobile device.

7. The mobile device of claim 1 wherein a user defines the untrusted location and the corresponding at least one untrusted location protocol.

8. A method for providing security for a mobile device, the method comprising:
   defining an untrusted location;
   defining at least one untrusted location protocol that corresponds to the untrusted location, wherein the at least one untrusted location protocol specifies at least one action that provides security for the mobile device when the mobile device is in the untrusted location, wherein the at least one action comprises disabling notifications for e-mail, text messages, phone calls and alarms on the mobile device, and disabling a plurality of network interfaces in the mobile device;
   detecting a current location of the mobile device;
   detecting when the current location is in the untrusted location, and in response, executing the at least one untrusted location protocol corresponding to the untrusted location; and
   detecting when the current location is no longer in the untrusted location, stopping execution of the at least one untrusted location protocol corresponding to the untrusted location, thereby discontinuing the disabling of the notifications for e-mail, text messages, phone calls and alarms on the mobile device and thereby discontinuing the disabling of the plurality of network interfaces on the mobile device.

9. The method of claim 8 wherein the at least one action comprises enforcing security for the mobile device that is native to the mobile device.

10. The method of claim 8 wherein the at least one action comprises enforcing enhanced security for the mobile device, wherein the advanced security comprises biometric authentication.

11. The method of claim 8 wherein the at least one action comprises enforcing enhanced security for the mobile device, wherein the advanced security comprises multi-level authentication for the mobile device.

12. The method of claim 8 wherein the at least one action comprises disabling at least one feature of the mobile device.

13. The method of claim 8 wherein the at least one action comprises locking the mobile device and blanking a display on the mobile device.

14. The method of claim 8 further comprising a user defining the untrusted location and the corresponding at least one untrusted location protocol.

15. A method for providing security for a mobile device, the method comprising:
   a user using the mobile device to define a plurality of untrusted locations;
   for each untrusted location, the user defining at least one untrusted location protocol that corresponds to the untrusted location, wherein the at least one untrusted location protocol specifies at least one action that provides security for the mobile device when the mobile device is in the untrusted location;
   detecting a current location of the mobile device;
   detecting when the current location is in one of the plurality of untrusted locations, and in response, executing the at least one untrusted location protocol, which performs the steps of:
      enforcing enhanced security for the mobile device that is not native to the mobile device, wherein the enhanced security comprises biometric authentication and multi-level authentication;
      disabling notifications for e-mail, text messages, phone calls and alarms on the mobile device;
      disabling a plurality of network interfaces on the mobile device including a telephone network interface, a Bluetooth interface, and a Wi-Fi interface;
      disabling at least one feature of the mobile device;
      locking the mobile device; and
      blanking a display on the mobile device; and
   detecting when the current location is no longer in any of the plurality of untrusted locations, and in response, stopping execution of all untrusted location protocols, thereby enabling the notifications for e-mail, text messages, phone calls and alarms on the mobile device and enabling the plurality of network interfaces on the mobile device.

* * * * *